United States Patent [19]

Okamoto et al.

[11] Patent Number: 4,931,259

[45] Date of Patent: Jun. 5, 1990

[54] FLUIDIZED-BED REACTION APPARATUS AND A FLUDIZING BED REACTION PROCESS USING THE SAME

[75] Inventors: Tsuneo Okamoto; Yasuo Sakaguchi, both of Iwaki, Japan

[73] Assignee: Kureha Kagaku Kogyo Kabushiki Kaishi, Tokyo, Japan

[21] Appl. No.: 280,408

[22] Filed: Dec. 6, 1988

[30] Foreign Application Priority Data

Dec. 10, 1987 [JP] Japan .................. 62-312475
Nov. 21, 1988 [JP] Japan .................. 63-294272

[51] Int. Cl.⁵ .......................... B01J 8/18; F27B 15/00
[52] U.S. Cl. .................... 422/143; 34/57 A; 110/245; 122/4 D; 431/7
[58] Field of Search ............ 110/245; 122/4 D; 34/57 A; 431/7, 170; 165/104.16; 422/143; 432/58

[56] References Cited

U.S. PATENT DOCUMENTS

| | | | |
|---|---|---|---|
| 3,277,582 | 10/1966 | Munro et al. ............ | 34/57 A |
| 3,309,784 | 3/1967 | Adams ...................... | 34/57 A |
| 3,437,073 | 4/1969 | Drake . | |
| 3,881,857 | 5/1975 | Hoy et al. ................. | 431/7 |
| 3,915,657 | 10/1975 | Staffin et al. ............. | 432/58 X |
| 4,259,088 | 3/1981 | Moss ........................ | 431/7 X |
| 4,446,629 | 5/1984 | Stewart et al. ........... | 34/57 A |

FOREIGN PATENT DOCUMENTS 0042095 3/1981 European Pat. Off. .
0056851 11/1981 European Pat. Off. .
53-102138 1/1977 Japan .

*Primary Examiner*—Edward G. Favors
*Attorney, Agent, or Firm*—Nixon & Vanderhye

[57] ABSTRACT

Disclosed herein is a fluidized-bed reaction apparatus comprising a perforated plate located in the lower portion of a fluidized-bed reaction tower for forming fluidized-bed of particles thereon, the plate having regions with different opening ratios, at least the outer peripheral portion and the geometrical center portion of the plate having an opening ratio larger than an average opening ratio of the plate, inlets of a heating-fluidizing gas and the particles receiving the reaction, outlets of the particles and a discharge gas, and a fluidized-bed reaction process using such an apparatus. Upon operation of the apparatus, stationary circulation of the particles is obtained in the fluidized-bed thereby the particles are scarcely pulverized or entrained and the circulation velocity is increased.

4 Claims, 3 Drawing Sheets

FLUIDIZED-BED REACTION APPARATUS AND A FLUDIZING BED REACTION PROCESS USING THE SAME

BACKGROUND OF THE INVENTION

The present invention relates to a fluidized-bed reaction apparatus with less pulverization of particles in a fluidized-bed reaction tower and less scattering of the particles therefrom and capable of easy temperature control, and a fluidizing bed reaction process using such an apparatus.

There has been the following problems in the treatment accompanying with the heat generation in a fluidized-bed in the fluidized-bed reaction tower.

In granulation and oxidative infusibilization of a petroleum pitch, for instance, it has been generally employed a process of subjecting a granulated pitch (pitch particles) to oxidative infusibilization treatment under the fluidized state thereof by air while elevating a temperature. However, since an excessive amount of air is required for removing large quantity of heat generated due to oxidation by using only the fluidizing air, even how the fluidized-bed is an apparatus excellent in view of the heat-utilizing efficiency because of the too low circulating speed of the particles, it can not be said preferable. Also, there is the similar problem in endothermic reaction. Further, although it may be considered to dispose a heat-removing device such as cooling pipes, etc. to the inside of the fluidized-bed, such a method is not preferable because the disposed pipes cause to hinder the fluidization of granulated particles thereby occurring local heat generation and uncontrollable exothermic reactions. Particularly, since a sufficient amount of oxidizing air for forming the fluidized-bed is supplied near a perforated plate as compared with other portions, as the size of the apparatus becomes large, if the movement of the particles slows down once, the amount of heat generated becomes greater than the amount of heat removed tending to cause rapid reaction. Generally, in order to make the movement of the particles vigorous the flow rate of the fluidizing gas should be raised, however, in a large scale apparatus, since the height of the fluidized-bed is increased in view of the processing efficiency, the fluidizing gas grows into huge gas bubbles and burst up in the upper portion of the fluidized-bed, thereby causing remarkable entrainment of the particles.

Further, the removal of heat by using cooling pipes, etc. does not show rapid response for the cooling effect substantially, making it difficult for the temperature control in the case of the exothermic reaction such as oxidation which is high in the temperature-dependency.

The present inventors have applied a method of water-spraying onto the fluidized-bed in the fluidized-bed reaction apparatus, in order to rapidly remove the heat of oxidation in the oxidative infusibilization reaction for granulated pitch, but it takes much time for the particles cooled in the upper portion to flow downwardly near the perforated plate in a large-scale fluidized-bed thus tending to form temperature distribution in the fluidized-bed. By such a reason, it causes such a vicious cycle that if a temperature distribution is once formed, a temperature is elevated more at a place where the temperature is higher.

Further, in conventional gas-solid type reaction apparatus, there has been employed a method of recovering pulverized and entrained particles by a cyclone and returning them to the inside of a fluidized-bed only for the purpose of reacting the fluidized particles with gases. As seen from such method, the improvement for the technique has usually been directed to increase the suerficial gas velocity but no substantial study has been made for the moderation of the movement of particles by lowering the superficial gas velocity as low as possible for obtaining products with no pulverized particles from the fluidized-bed.

The present inventors have studied on a process of fluidized-bed reaction and a fluidized-bed reaction apparatus capable of preventing the entrainment and pulverization of particles, increasing the circulation velocity of the particles and making temperature control easy, and as a result, it has been found that the circulation velocity of particles is great even if the average superficial gas velocity is low and the particles are scarcely pulverized or entrained, by using a fluidized-bed reaction apparatus comprising:

a perforated plate disposed in the lower portion of a fluidized-bed reaction tower for forming a fluidized-bed of particles thereon, having the opening ratio and the area each at a specific ratio between the outer peripheral portion and the inner portion, or between the outer peripheral portion with the geometrical central portion and the inner portion of the perforated plate, an inlet of a heating-fluidizing gas located below the perforated plate, an outlet of the particles located above the perforated plate, an inlet of the particles receiving the reaction in the fluidized-bed, located in the upper portion of the reaction tower and above the fluidized-bed, and an outlet of a discharge gas located at the top of the reaction tower; and conducting the fluidized-bed reaction by introducing heating-fluidizing air at a temperature required for the reaction at a specific flow rate. Based on such findings, the present invention has been attained.

SUMMARY OF THE INVENTION

In a first aspect of the present invention, there is provided a fluidized-bed reaction apparatus comprising:

a perforated plate disposed in the lower portion of a fluidized-bed reaction tower for forming fluidized-bed of particles thereon, the perforated plate having regions with different opening ratio, at least outer peripheral portion of the perforated plate having a larger opening ratio than an average opening ratio of the perforated plate, the ratio of the area of the portion having the larger opening ratio than the average opening ratio to the area of the portion having an opening ratio not more than the average opening ratio being 1:15 to 1:2, and an average opening ratio of the portion having the larger opening ratio than the average opening ratio being 2 to 8 times larger than an average opening ratio of the portion having the opening ratio not more than the average opening ratio, an inlet of a heating-fluidizing gas located below the perforated plate;

an outlet of the particles located above the perforated plate;

an inlet of the particles receiving the reaction in the fluidized-bed, located in the upper portion of the reaction tower and above the fluidized-bed formed on the perforated plate; and an outlet of a discharge gas located at the top of the reaction tower.

In a second aspect of the present invention, there is provided a fluidizing-bed reaction process, comprising introducing a heating-fluidizing gas of a temperature required for the reaction to a fluidized-bed reaction apparatus comprising:

a perforated plate disposed in the lower portion of a fluidized-bed reaction tower for forming fluidized-bed of particles thereon, the perforated plate having regions with different opening ratio, at least outer peripheral portion of the perforated plate having a larger opening ratio than an average opening ratio of the perforated plate, the ratio of the area of the portion having the larger opening ratio than the average opening ratio to the area of the portion having an opening ratio not more than the average opening ratio being 1:15 to 1:2, and an average opening ratio of the portion having the larger opening ratio than the average opening ratio being 2 to 8 times larger than an average opening ratio of the portion having the opening ratio not more than the average opening ratio, an inlet of a heating-fluidizing gas located below the perforated plate;

an outlet of the particles located above the perforated plate;

an inlet of the particles receiving the reaction in the fluidized-bed, located in the upper portion of the reaction tower and above the fluidized-bed formed on the perforated plate; and an outlet of a discharge gas located at the top of the reaction tower;

so as to satisfy the following formulae (I) and (II):

$$U_{OA}/U_{mf} = 1.2 \sim 2.5 \quad (I)$$

$$(U_{OB} - U_{mf})/(U_{OA} - U_{mf}) > 5 \quad (II)$$

(wherein $U_{mf}$ represents the minimum fluidizing velocity, $U_{OB}$ represents an average superficial velocity of a gas on the portion having the larger opening ratio than the average opening ratio, in which the gas passes through the portion thereof, and $U_{OA}$ represents an average superficial velocity of a gas on the portion having the opening ratio not more than the average opening ratio, in which the gas passes through the portion thereof, under the temperature and the pressure in the fluidized-bed.

DETAILED DESCRIPTION OF THE INVENTION

Figure 1:
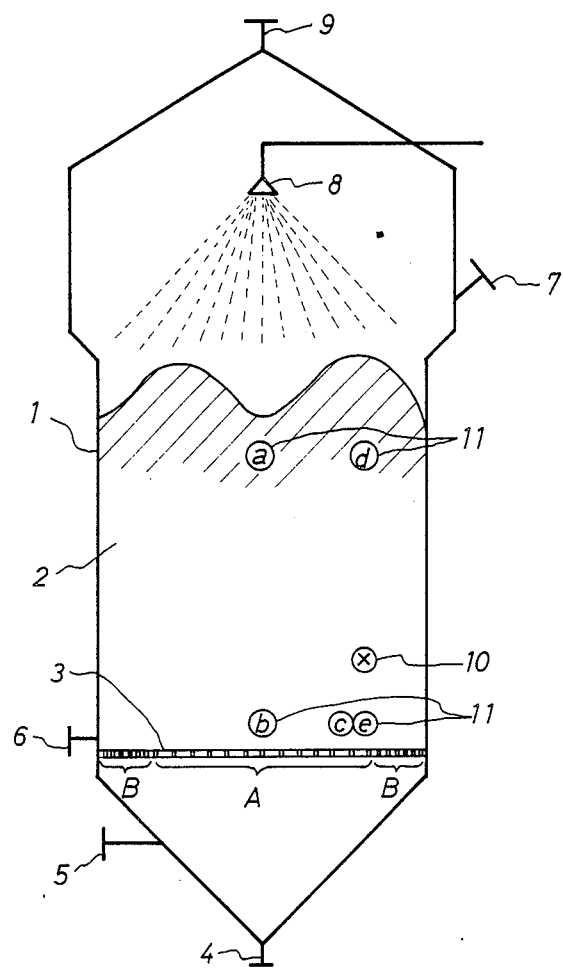
FIG. 1 is a schematic view for a fluidized-bed reaction apparatus according to the present invention.

The fluidized-bed reaction tower 1 shown in FIG. 1 shows one embodiment of the fluidized-bed reaction apparatus according to the present invention and has a perforated plate 3 located at the lower portion thereof in which a fluidized-bed 2 is formed on the perforated plate 3. The perforated plate 3 has regions of different opening ratio, and at least outer peripheral portion B of the perforated plate 3 has a larger opening ratio than an average opening ratio of the perforated plate 3. The ratio of the area of the portion having the larger opening ratio than the average opening ratio to the area of the portion having an opening ratio not more than the average opening ratio is 1:15 to 1:2, preferably 1:10 to 1:3. For example, the ratio of the area of the outer peripheral portion B to the area of an inner portion A is 1:15 to 1:2, preferably 1:10 to 1:3. An average opening ratio of the portion having the larger opening ratio than the average opening ratio is 2 to 8 times, preferably 3 to 6 times larger than an average opening ratio of the portion having the opening ratio not more than the average opening ratio. The opening ratio mentioned herein means an opening ratio of the surface of the perforated plate forming the fluidized-bed, the area includes the perforated parts and means an area of the surface of the perforated plate forming the fluidized-bed, and the peripheral portion is a part including periphery.

An outlet of the drain 4 is located at the bottom of the fluidized-bed reaction tower 1, while an inlet 5 of the heating-fluidizing gas is located below the perforated plate 3. An outlet 6 of the particle is located above the perforated plate 3 and in the lower portion of the fluidized-bed 2. Further, an inlet 7 of the particle receiving the reaction in the fluidized-bed 2 is located in the upper portion of the fluidized-bed reaction tower 1 and above the fluidized-bed 2, and a spray nozzle 8 of the cooling water is located at the top of the fluidized-bed reaction toward 1 and above the fluidized-bed 2. An outlet 9 of discharge gas is located at the top of the fluidized-bed reaction tower 1.

The outlet of the drain 4 and the spray nozzle 8 of the cooling water are not necessary in the case where the particles receiving the reaction are only subject to endothermic reaction and as will be seen from the later-mentioned, in the case where the removal of the generated heat is possible only by the heating-fluidized gas due to increase of circulation velocity according to the present invention.

For observing the movement of particles and the gas bubbles in the fluidized-bed 2 of the reaction tower 1 shown in FIG. 1, each of the perforated plate 3 according to the present invention and the conventional perforated plate 12 is provided on the lower portion of a semi-circular cylinder (1 m diameter) to a vertical section of which a transparent vinyl chloride plate is fixed, spherical activated carbon particles are charged and air is introduced from the bottom, respectively. Then, the result for the observation of the fluidized state in the respective cases are shown in FIG. 2 and FIG. 3.

Figure 2A:
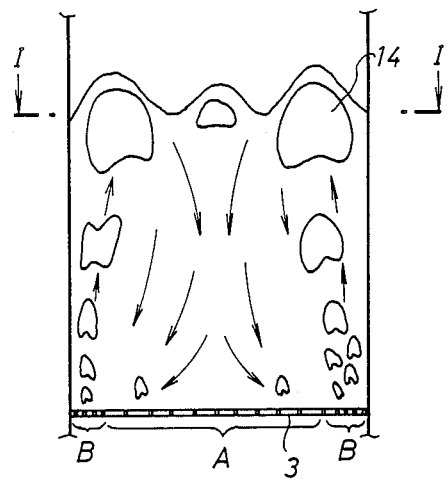
FIG. 2a and FIG. 2b are views showing the states of the fluidized-bed in the present invention.
Figure 3A:
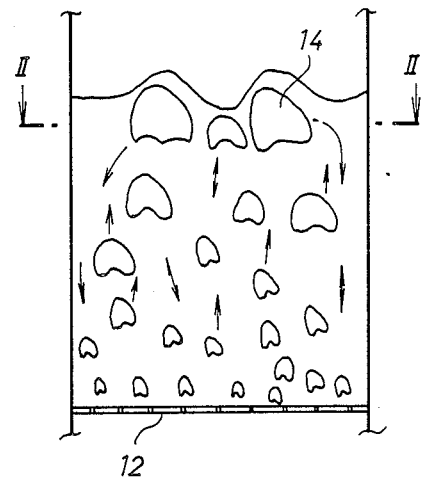
FIG. 3a and FIG. 3b are views showing the states of the conventional fluidized-bed and FIG. 4 is a view showing another perforated plate in the fluidized-bed reaction apparatus according to the present invention.
Figure 2B:
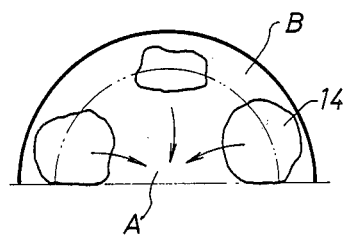
Figure 3B:
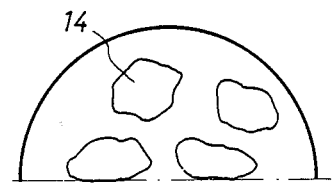

FIGS. 2a and 2b are views showing the fluidized state when using the perforated plate according to the present invention, whereas FIGS. 3a and 3b are views showing the fluidized state when using the conventional perforated plate.

In FIGS. 3a and 3b, the average grain size of the activated carbon particles used is 600 μm, the minimum fluidizing velocity ($U_{mf}$) is 11 cm/S, the height of the stationary bed is 900 mm, the opening ratio of the perforated plate is about 0.8% and the average superficial gas velocity ($U_O$) was 15~25 cm/s. FIG. 3a is a front view and FIG. 3b is a cross sectional view taken along line II—II in the upper portion of the fluidized-bed. As the superficial gas velocity is increased, the gas bubbles 14 grow larger and particles are sprung up violently. In the fluidized-bed, there are portions where particles move up and down and portions where they flow downwardly as shown by the arrow, and the portion where they move up and down moves with time.

This phenomenon is explained as follows. If gases pass uniformly from each of the points (perforate) on the perforated plate, gas bubbles gather toward the center as is shown in FIG. 3a, thereby forming the downward stream for a portion of particles near the wall in the upper portion, whereas the gas bubbles uprise at random and accordingly, the downward flow of the particles is hindered and some amounts of particles go up and down repeatedly in the middle portion of the fluidized-bed.

On the other hand, FIG. 2a, shows the front view of the fluidized-bed reaction tower 1 of one of the embodiment in the present invention and FIG. 2b is a cross sectional view taken along line I—I in the upper portion of the fluidized-bed thereof. By using a perforated plate capable of satisfying the condition that the ratio of an average opening ratio of the peripheral portion of the perforated plate is 2 to 8 times, preferably 3 to 6 times larger than an average opening ratio of the other portion (hereinafter referred to as "internal portion") and the ratio of the area of the peripheral portion of the perforated plate to the area of the internal portion of the perforated plate is 1:15 to 1:2, preferably 1:10 to 1:3, constant downward flow of the particles as shown by the arrow in FIG. 2a can be obtained even if the average superficial gas velocity $U_{OA}$ of the gas passing through the internal portion of the perforated plate, on the internal portion thereof is as low as 1.2~2.5 times of the minimum fluidizing velocity $U_{mf}$.

When the perforated plate according to the present invention is used, since a great amount of gas flows from the vicinity of the wall as shown in FIG. 2a, the gas bubbles rise nearer to the wall as compared with the case in FIG. 3a, although it somewhat directs to the central part, and the gas bubbles reach the top of the fluidized-bed. Accordingly, gas bubbles are not burst near the central part and the particles are always drawn downwardly along the direction of arrows and then, rise together with the gas bubbles as shown in FIGS. 2a and 2b.

Moreover, by deciding the average superficial gas velocity $U_{OB}$ passing through the peripheral portion of the perforated plate, on the peripheral portion thereof so as to satisfy the following formula:

$$(U_{OB}-U_{mf})/(U_{OA}-U_{mf}) > 5$$

it is possible to raise the circulation velocity of the particles and to attain the treatment of the fluidized-bed which makes the temperature control easy.

In the formula, $U_{mf}$ represents a value naturally given in the case of deciding the particles which receive the reaction in the fluidized-bed, the temperature in the fluidized-bed and the pressure in the fluidized-bed, and $U_{OA}$ is limited to 1.2 to 2.5 times of $U_{mf}$ as described before. Moreover, since the ratio of the total sum of the area of the geometric center portion and the area of the peripheral portion to the area of the internal portion is made to be 1:15 to 1:2 peripheral portion to the area of the, the upper limit of $U_{OB}$ is naturally limited. $U_{OA}$ and $U_{OB}$ can be obtained from the average superficial gas velocity in the whole of the fluidized-bed $U_O$, the area ratio of each portion of the perforated plate and the opening ratio of the holes.

Figure 4:
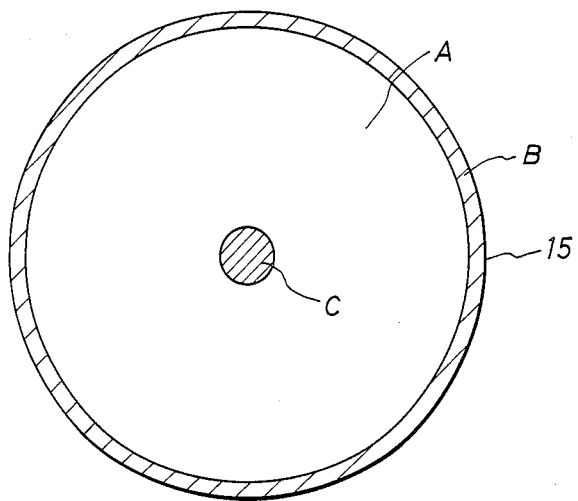

Hereupon, in the case where the height of the fluidized-bed is small as compared with the internal diameter of the fluidized-bed, since a portion which prevents the circulation of the particles is formed on the geometrical center portion of the perforated plate, it is necessary to make the average opening ratio of the geometrical center portion larger than that of the internal portion in order to circulate the particles at a high speed (refer to FIG. 4).

In such a case, the average opening ratio of the geometrical center portion and the peripheral portion of the perforated plate is larger than the average opening ratio of the internal portion, namely, the ratio of the average opening ratio of the geometrical center portion and the peripheral portion to the average opening ratio of the internal portion is 2:1 to 8:1, preferably 3:1 to 6:1, and the ratio of the area of the internal portion to the total sum of the area of the geometrical center portion and the area of the peripheral portion is made to be 1:15 to 1:2, preferably 1:10 to 1:3. Hereupon, the geometrical center portion means the part including the geometrical center of the surface of the side forming fluidized-bed and has the larger opening ratio than the average opening ratio. The ratio of the area of the peripheral portion to the area of the geometrical center portion is preferably 5:1 to 15:1.

In the case where the height of the fluidized-bed is much smaller as compared to the internal diameter of the fluidized-bed, the part which prevents the circulation of the particles occurs in one or multiple number of regions of the perforated plate between the geometrical center portion and the peripheral portion other than the geometrical center portion. In such a case, it is necessary to make the opening ratio of that portion larger than the average opening ratio of the perforated plate. On such occasion, the ratio of the area of the portion having the larger opening ratio than the average opening ratio to the area of the portion having the opening ratio not more than the average opening ratio is 1:15 to 1:2, preferably 1:10 to 1:3, and an average opening ratio of the portion having the larger opening ratio than the average opening ratio of the perforate plate is 2 to 8 times, preferably 3 to 6 times larger than an average opening ratio of the portion having the opening ratio not more than the average opening ratio of the perforated plate.

Also in the case of using the perforated plate which has the portion having such a large opening ratio in the geometrical center portion as the peripheral portion and, according to circumstances, in other portion than the peripheral portion and the geometrical center portion, the following formulae concerning $U_{OA}$ and $U_{OB}$ should be satisfied.

$$U_{OA}/U_{mf} = 1.2 \text{ to } 2.5$$

$$(U_{OB}-U_{mf})/(U_{OA}-U_{mf}) > 5$$

As a matter of course, in this case, $U_{OB}$ is the average superficial velocity of a gas on the portion having the larger opening ratio than the average opening ratio of the perforated plate in which the gas passes through the portion having the large opening ratio and $U_{OA}$ is the average superficial velocity of the gas on the portion having the opening ratio not more than the average opening ratio of the perforated plate in which the gas passes through the portion having the opening ratio not more than the average opening ratio.

As the reaction to which the fluidized-bed reaction apparatus and the reaction process in fluidized-bed according to the present invention is applied, any reaction can be exemplified in the case where the reaction is exothermic or endothermic, however, the present invention is effective in the case of exothermic reactions, particularly in the case of oxidation reaction because of the fear of runaway reaction.

As the solid material (particles) which receives the reaction, materials in a wide range from the material having a high melting point such as inorganic materials, for instance, zeolite, zirconia and the like to the material having a low melting point such as petroleum pitch beads, chitin and collagen are used.

Further, as the heating fluidizing gas, air, steam, gaseous nitrogen, combustion gas, etc. may be exemplified. The temperature of the heating fluidizing gas may be the temperature necessary for the reaction, and although the temperature differs due to the solid-gas reaction system, for instance, in the case when petroleum pitch beads (i.e. spherical pitch beads of an average particle diameter of 250 to 800 μm) are subjected to oxidative infusibilization, air at 130° to 150° C. is suitably used.

According to the present invention, even in the case of using a small average superficial gas velocity, it is possible to obtain the reaction process in fluidized-bed and the fluidized-bed reaction apparatus capable of preventing the pulverization and/or entrainment of the particles, and increasing the circulation velocity of the particles. Moreover, the temperature control of the apparatus according to the present invention is easy and the apparatus can be automatically operated while following the established temperature profile.

The present invention is to be described more specifically referring to examples but the invention is not limited only to these examples.

EXAMPLE 1

Oxidative infusibilization was conducted for petroleum pitch beads (spherical pitch beads) with the average particle size of 470 μm in the fluidized-bed reaction apparatus shown in FIG. 1 having the fluidized-bed of 1200 mm inner diameter and the stationary layer height of about 1000 mm. The perforated plate has an opening ratio of 1.77% in the outer peripheral portion of 60 mm width (portion B) and had an opening ratio of 0.44% in the internal portion of 1080 mm diameter (portion A) (the average opening ratio for the entire portion of the perforated plate was 0.69%). Further, the pore size was 1.5 mm. Five thermocouples 11 were set in the fluidized-bed as shown in FIG. 1.

The temperature in the fluidized-bed was controlled by an automatic temperature controller and was elevated from 120° C. to 300° C. at the rate of 0.3° C./min. The elevating of temperature was carried out by the heated air at 150° C. Since the temperature elevating rate in the fluidized-bed became higher than the predetermined rate from about 150° C. due to the oxidizing heat-generation, water spray was conducted for temperature control so that the rate matched with the temperature profile.

A thermocouple (a) was set at the central portion above the perforated plate at a distance of 1000 mm therefrom, a thermocouple (b) was set at the central portion above the perforated plate at a distance of 50 mm therefrom, a thermocouple (c) was set at a position 50 mm above the perforated plate and apart by 200 mm from the wall, a thermocouple (d) was set just above the thermocouple (c) and aparted by 1000 mm from the perforated plate, and a thermocouple (e) was set within the same level as the thermocouple (c) and at a position deviated with 90° by the angle of center and above the perforated plate apart by 50 mm therefrom. The thermocouples (a)–(e) were connected with a pen-writing recorder for continuously recording to temperature at each of the positions. As a result, the temperature at the position of the thermocouples (a) and (d) was lowered substantially simultaneously with the water spray, while the temperature at the position of the thermocouple (b) was lowered 1.5–3 sec thereafter, and the temperature at the positions of the thermocouples (c) and (e) caused temperature change 2–4 sec thereafter. The temperatures at the positions of the thermocouples (a)–(b) were substantially identical within five sec after stopping the spray.

Since $U_{mf}$ of the pitch beads was set to 7.0 cm/s, and the average superficial gas velocity $U_O$ over the entire fluidized-bed was set to 21.0–25.0 cm/s, $U_{OA}$ was from 13.4 to 16.0 cm/s and $U_{OB}$ was from 53.6 to 63.8 cm/s, while $(U_{OA}/U_{mf}) = 1.9 \sim 2.3$ and $(U_{OB} - U_{mf})/(U_{OA} - U_{mf}) = 6.3 \sim 7.3$. It was possible for automatic operation in accordance with the temperature profile set under the conditions and, further, fluidized-bed reaction could be conducted with small amount of particle pulverization and scattering.

COMPARATIVE EXAMPLE

In the same device as in Example 1 except for changing the perforated plate with a perforated plate of a uniform pore distribution having the opening ratio of 0.69%, reaction was conducted under the same temperature profile as in Example 1 with the average superficial gas velocity $U_O$ in the fluidized-bed of from 21 to 25 cm/s. Particles of substantially the same particle size were used. As a result, there was often found a difference from 3 to 15 sec between the fall of the temperature at the positions of the thermocouples (a) and (d) and the fall of the temperature at the positions of the thermocouples (b), (c) and (e) after water spraying although $U_O/U_{mf} = 3 \sim 3.6$, occasionally showing a delay of greater than 30 sec, and no stationary circulation of particles was obtained.

When the oxidative infusibilization was conducted under this state, since the temperature at the point (e) was made higher by greater than 5° C. than the temperature at the measuring-end point of the temperature controller and the difference of the temperature tended to be greater, the amount of water spray was manually increased and $U_O$ was also increased temporarily to 30 cm/s to unify the internal temperature of the fluidized-bed. The operation had to be conducted 4 times till the completion of the reaction.

EXAMPLE 2

Oxidative infusibilization for petroleum pitch beads (spherical pitch beads) was conducted by disposing a perforated plate 15 having an outer peripheral portion (portion B) of 60 mm width and a central portion (portion C) of 300 mm diameter shown in FIG. 4 to the fluidized-bed of 2700 mm diameter. The ratio between the area in the portion A and the sum of the area of the portion (B) and the portion (C) was about 9:1, and the ratio of the opening ratio of the portion (A) to each of the opening ratio of the portion (B) and the opening ratio of the portion (C) was set to 1:4. Reaction was conducted for the particles with the average particle size of 600 μm and $U_{mf}=11$ cm/s at the average superficial gas velocity $U_O$ over the entire fluidized-bed=20~25 cm/s and automatic operation was conducted in accordance with the temperature profile set to 8 hours from 150° C. to 300° C.

Under this condition, $U_{OA}/U_{mf}=1.4\sim1.7$; $(U_{OB}-U_{mf})/(U_{OA}-U_{mf})=8.1\sim11.8$.

There was rare pulverization and/or scattering of the particles.

What is claimed is:

1. A fluidized-bed reaction apparatus comprising:
    a perforated plate located in the lower portion of a fluidized-bed reaction tower for forming a fluidized-bed of particles thereon, the perforated plate having regions with different opening ratios, at least the outer peripheral portion and the geometrical center portion of the perforated plate having a larger opening ratio than an average opening ratio of the perforated plate, the ratio of the area of the portion having the larger opening ratio than the average opening ratio to the area of the portion having an opening ratio not more than the average opening ratio being 1:15 to 1:2, and an average opening ratio of the portion having the larger opening ratio than the average opening ratio being 2 to 8 times larger than an average opening ratio of the portion having the opening ratio not more than the average opening ratio;
    an inlet for a heating-fluidized gas located below said perforated plate;
    an outlet for the particles located above the perforated plate;
    an inlet for the particles receiving the reaction in the fluidized-bed, located in an upper portion of the reaction tower and above the fluidized-bed formed on the perforated plate; and
    an outlet for discharging gas located at the top of the reaction tower.

2. A fluidized-bed reaction apparatus according to claim 1, wherein the ratio of the area of the peripheral portion of said perforated plate to the area of the geometrical center portion thereof is 5:1 to 15:1.

3. A fluidized-bed reaction apparatus according to claim 1 or 2, including a spray nozzle located at the top of the fluidized-bed reaction tower and above the fluidized-bed for spraying cooling water, and an outlet of drain located at the bottom of the fluidized-bed reaction tower.

4. A fluidized bed reaction process using a fluidized-bed reaction apparatus according to any one of claim 1 or 2, comprising introducing heating-fluidizing gas of a temperature required for the reaction to the fluidized-bed reaction apparatus under a condition which satisfies the following formulae (I) and (II):

$$U_{OA}/U_{mf}=1.2-2.5 \tag{I}$$

$$(U_{OB}-U_{mf})/(U_{OA}-U_{mf})> \tag{II}$$

wherein $U_{mf}$ represents a minimum fluidizing velocity, $U_{OB}$ represents an average superficial velocity of a gas on the portion having the larger opening ratio than the average opening ratio, through which portion the gas passes and $U_{OA}$ represents an average superficial velocity of a gas on the portion having the opening ratio not more than the average opening ratio, through which portion the gas passes, under the temperature and the pressure in the fluidized-bed.

* * * * *

UNITED STATES PATENT AND TRADEMARK OFFICE
CERTIFICATE OF CORRECTION

PATENT NO. : 4,931,259

DATED : June 5, 1990

INVENTOR(S) : Tsuneo Okamoto; Yasuo Sakaguchi

It is certified that error appears in the above-identified patent and that said Letters Patent is hereby corrected as shown below:

On the title page, item [54] and in column 1, lines 1-4:

Correct the title to read FLUIDIZED-BED REACTION APPARATUS AND A FLUIDIZING BED REACTION PROCESS USING THE SAME On the title page, item [73]:

The assignee should read KUREHA KAGAKU KOGYO KABUSHIKI KAISHA

Signed and Sealed this

Twenty-fourth Day of December, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,931,259
DATED : June 5, 1990
INVENTOR(S) : Tsuneo OKAMOTO, et al It is certified that error appears in the above-identified patent and that said Letters Patent is hereby corrected as shown below:

Column 2, line 5, change "suerficial" to --superficial--.

Column 4, line 61, change "cm/S" to --cm/s--.

Column 5, line 50, change "$(U_{OB}=U_{mf})$" to --$(U_{OB}-U_{mf})$--.

Column 8, line 24, change "$(U_{OA}=U_{mf})$" to --$(U_{OA}-U_{mf})$--.

Column 10, line 24, equation (II), change to read

--$(U_{OB}-U_{mf})/(U_{OA}-U_{mf}) > 5$--.

Signed and Sealed this

Twenty-eighth Day of July, 1992

Attest:

DOUGLAS B. COMER

Attesting Officer     Acting Commissioner of Patents and Trademarks